No. 709,510. Patented Sept. 23, 1902.
C. B. POST.
GIB AND KEY DEVICE.
(Application filed Apr. 26, 1902.)
(No Model.)
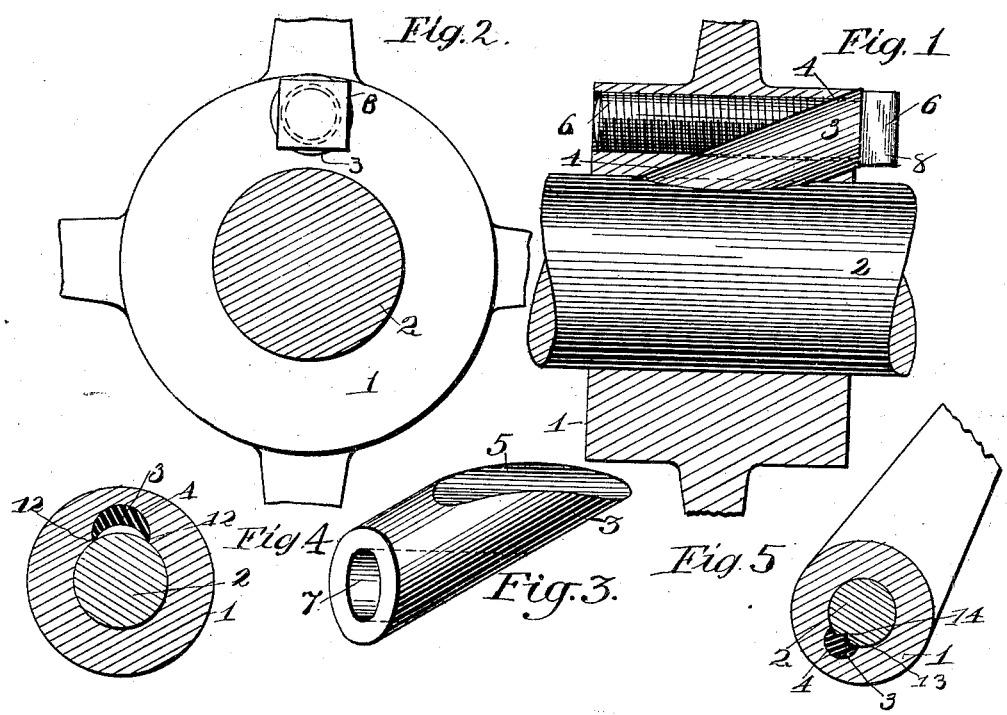

UNITED STATES PATENT OFFICE.

CHARLES B. POST, OF NEW LONDON, OHIO.

GIB-AND-KEY DEVICE.

SPECIFICATION forming part of Letters Patent No. 709,510, dated September 23, 1902.

Application filed April 26, 1902. Serial No. 104,895. (No model.)

*To all whom it may concern:*

Be it known that I, CHARLES B. POST, a citizen of the United States, and a resident of New London, county of Huron, State of Ohio, have invented certain new and useful Improvements in Gib-and-Key Devices, of which I hereby declare the following to be a full, clear, and exact description, such as will enable others skilled in the art to which it appertains to make and use the same.

The object of the invention is to provide means for securing a sleeve or hub of a wheel or gear to a shaft or for securing two butted shafts together in the most positive manner.

I accomplish my object by means of a diagonally-inserted bar in the hub or sleeve and a curved surface at the extremity of the bar where it engages the shaft arranged to coincide closely with the cylindrical surface of the shaft.

A feature of the invention also comprises means for adjusting the frictional contact, which also affords easy means for attaching the parts together or separating them quickly, so that the sleeve or hub can be changed in its position on the shaft either longitudinally or circumferentially without difficulty.

My invention consists in the details of construction and combination and arrangement of parts, as hereinafter described, shown in the accompanying drawings, and specifically pointed out in the claim.

In the accompanying drawings, Figure 1 is a longitudinal central section of wheel-hub, showing my device for securing the hub and shaft together. Fig. 2 is an end view of the same. Fig. 3 is a view of one of the individual clamping-dogs used in the other figures. Fig. 4 is a transverse section of a hub and shaft, showing the clamping-dog provided with a curved gripping-surface of less radius than the radius of the shaft, so that its edges alone engage the shaft; and Fig. 5 shows a modified form of a dog used where a number of wheels or gears are set upon the shaft and in which the identical points in each must be in alinement. Here a keyway is shown in the shaft, and a lug or rib is formed in the dog, so that each wheel can be moved along the shaft without disturbing its relative alinement with the others.

In the views, 1 is a sleeve or wheel-hub, in which the shaft 2 is inserted and to which it is to be secured. 3 is a cylindrical bar or dog which passes diagonally through an opening 4 in the sleeve or hub. The extremity of the dog which engages the shaft is cut diagonally at 5 to coincide with the cylindrical surface of the shaft with a curve having the same radius, so as to make the engaging surface as large as possible. This dog is then forced into frictional contact with the shaft by the following means:

6 is a screw or bolt inserted longitudinally through the hub or sleeve, passing diagonally through the outer end of the dog at 7, and provided with a head 8, and if a bolt it is provided also with a nut 9. By tightening the screw the head is forced against the outer extremity of the dog and pushes it toward the shaft. It will be seen that the dog is as readily released as secured by loosening the screw.

As many dogs or pairs of dogs may be employed as may be sufficient to make a rigid coupling or to make a large hub secure upon a shaft.

The dogs need not be cylindrical in shape, but may be of any convenient cross-section, and may be made broader than high, so as to provide a very large engaging surface.

At times when an unusual torsional strain is brought to bear upon a hub, as in the hub of a long lever, the engaging surface of the dog may be made with a shorter radius than that of the shaft, thus providing gripping edges at 12, Fig. 4, or a slight keyway may be used in the shaft, as at 13, Fig. 5, and a corresponding lug 14 upon the dog where it is desired to aline a number of wheels upon one shaft, thus preventing them from turning when they are slipped along the shaft.

Having described my invention, what I claim as new, and desire to secure by Letters Patent, is—

The combination with a shaft and inclosing sleeve or hub, of a dog diagonally passing through said hub or sleeve and means for adjustably securing said dog in engagement with the shaft, consisting of a longitudinally-adjustable screw passing through said hub and dog, substantially as described.

In testimony whereof I have signed my name to this specification in the presence of two subscribing witnesses.

CHARLES B. POST.

Witnesses:
WM. M. MONROE,
GEO. W. SHAW.